Dec. 16, 1930.  W. KIRN  1,785,091
DIFFERENTIAL GEARING
Filed Sept. 23, 1929   2 Sheets-Sheet 1

Inventor
William Kirn.
By Thorpe & Thorpe
Attorneys.

Dec. 16, 1930.   W. KIRN   1,785,091
DIFFERENTIAL GEARING
Filed Sept. 23, 1929   2 Sheets-Sheet 2
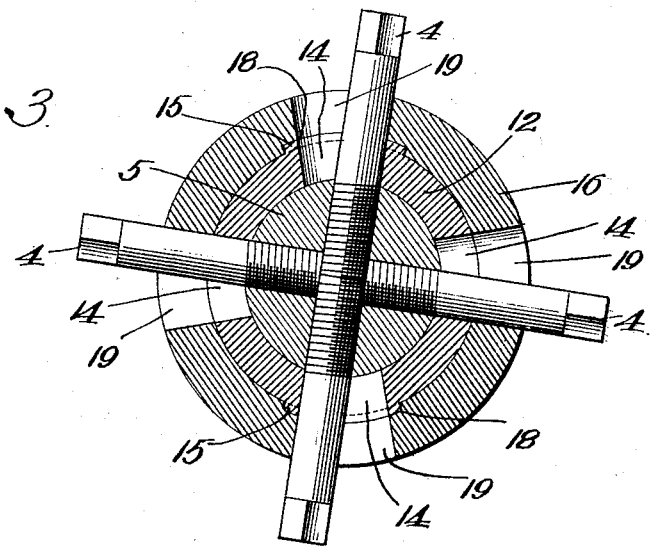
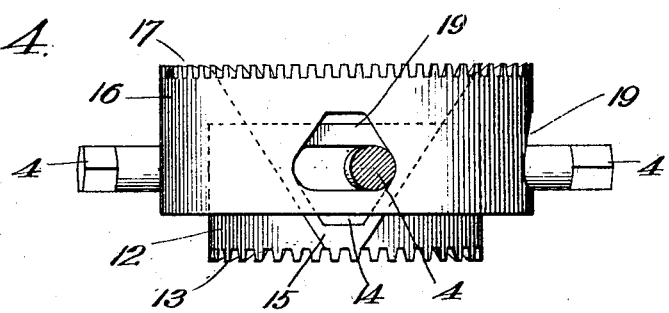
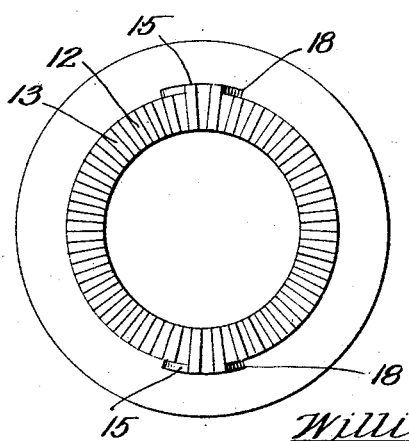

Patented Dec. 16, 1930

1,785,091

UNITED STATES PATENT OFFICE

WILLIAM KIRN, OF SOLOMON, KANSAS

DIFFERENTIAL GEARING

Application filed September 23, 1929. Serial No. 394,593.

This invention relates to differential gearing of that class through which power is always positively applied to both members or sections of the rear axle except when turning a curve or corner, so that if one drive wheel is on a slippery surface or in mud, where it has no traction, the other wheel will be capable of driving the car, and my object is to produce a differential gearing of the class mentioned, which is of very simple and efficient type and which moreover is comparatively inexpensive.

With this general object in view, the invention consists in certain novel and useful features of construction and combinations of parts as hereinafter described and claimed; and in order that it may be fully understood, reference is to be had to the accompanying drawings, in which:

Figure 1:
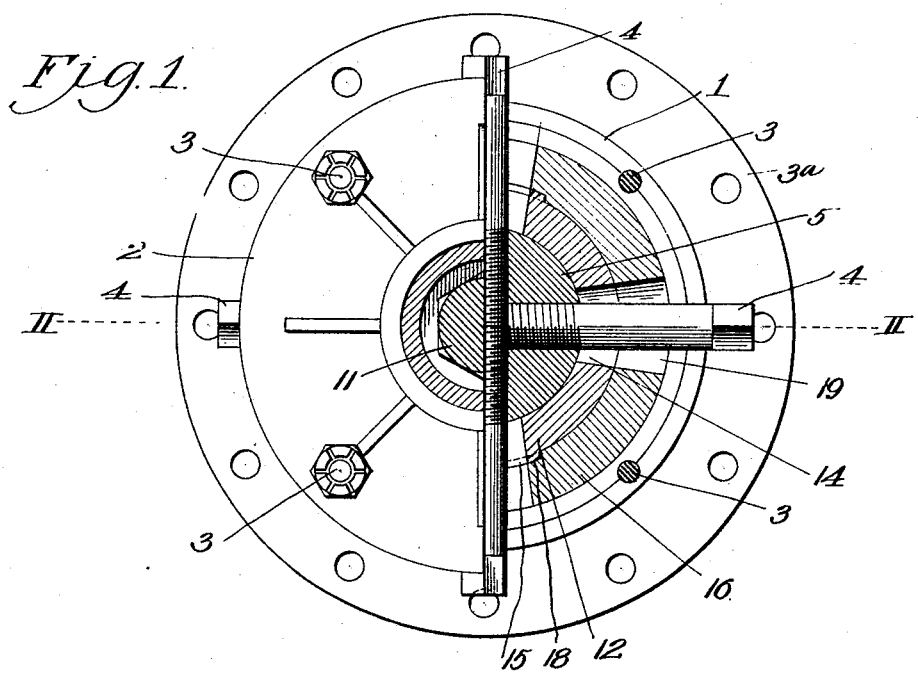
Figure 1 is a view half in side elevation and half in central vertical section, of a differential gearing embodying the invention.
Figure 2:
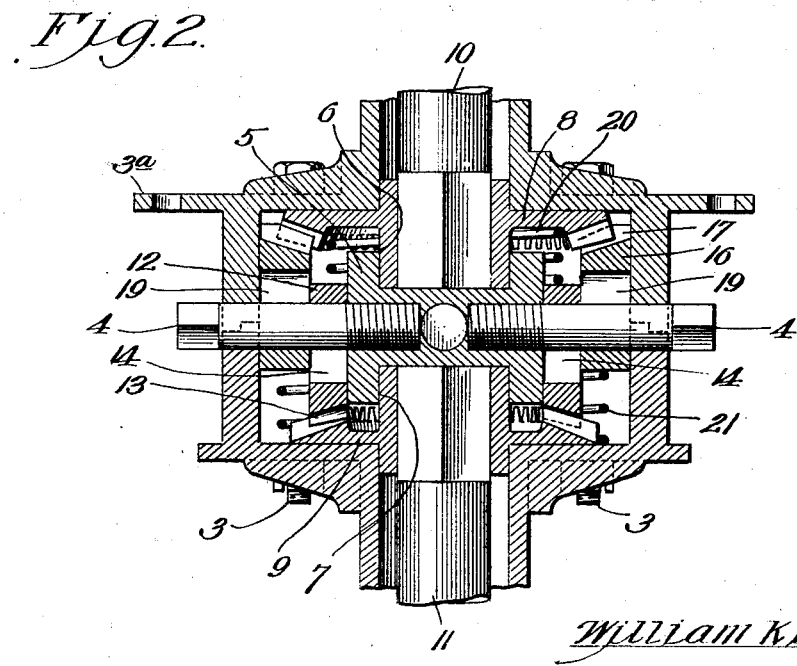
Figure 2 is a section on the line II—II of Figure 1.

Figure 3 is a central vertical section of the hub member, and of two telescopic sleeves for transmitting power respectively to the two members or sections of the rear axle or shaft, the figure also showing power transmitting pins secured to the hub and extending through the sleeves, the parts being shown in the positions which they occupy when both sleeves are effecting rotation of both axle members at the same speed.

Figure 4 is a top plan view of the mechanism illustrated by Figure 3.

Figure 5 is a side view of the construction shown by Figure 4.

In the said drawings, 1 and 2 represent two members of the cylindrical housing bolted together by cross bolts 3, the housing having a flange 3a, for securement to a gear (not shown) driven in any suitable manner from the drive shaft (not shown) of a motor car. Extending radially through the meeting edges of the housing members are four bolts 4, and these bolts are secured to a central cylindrical hub member 5 disposed centrally within the housing. Two of the bolts preferably abut endwise and the other pair abut at their inner ends against opposite sides of the abutting pair. The member 5 is provided in its opposite or side faces with axial sockets 6 and 7 to form journal openings for the hubs of a pair of bevel gear wheels 8 and 9, and the hubs of said gears 8 and 9 are internally angular in cross section and fit correspondingly ends of the two members 10 and 11 of the rear axle or shaft.

Journaled on the hub member 5 is a sleeve gear 12 having teeth 13 at one edge for intermeshing normally with the teeth of bevel gear 9. Said sleeve gear is provided with radial openings 14 of substantially triangular form, disposed so that lines bisecting their bases and apices respectively shall be parallel with the axis of the housing, and through said openings extend the bolts 4. Coincidentally, by preference, with an opposite pair of the openings 14, sleeve gear 12 is formed with substantially V-shaped external ribs or cams 15 paralleling the hypotenuse sides of the openings.

Fitting upon the sleeve gear 12 is a sleeve gear 16, and said gear 16 is provided with radial teeth 17 in its opposite edge from the toothed edge of sleeve gear 12, and the teeth 17 are normally intermeshed with the teeth of bevel gear 8. To receive and accommodate the V-shaped ribs or cams 15 of the sleeve gear 12, the sleeve gear 16 is provided with internal V-shaped recesses 18, which correspond in angular form but are of greater width circumferentially measured than the ribs or cams 15, and sleeve gear 16 is also provided with substantially triangular openings 19, through which the bolts or pins 4 extend, said openings being reversely disposed with respect to the openings 14.

A spring 20 fits in the housing and bears against the same and sleeve gear 12, and tends to force and hold the latter in geared engagement with bevel gear 9, and a similar spring 21 bears against the housing and the smooth edge of sleeve gear 16 to hold the toothed edge of the latter yieldingly intermeshed with the gear wheel 8.

When the parts are in normal position the sleeve gears 12 and 16, as stated, are in engagement with the respective gear wheels 8 and 9, and as a result rotative power applied to the housing or casing, is transmitted through the pins 4 to the two sleeve gears 12 and 16, and the latter through engagement with the gear wheels 9 and 8, transmit power to the shaft or axle members 10 and 11 at the same speed so that the car may travel in a straight line under the tractional operation of both drive wheels. In other words, power is transmitted to both axle members or sections to turn both wheels regardless of whether one has frictional engagement with the ground or not, as distinguished from the ordinary or conventional differential where all of the power goes to spin the wheel having no tractional engagement with the ground. It will be noted in this connection that each pin 4 is confined between the base edges of a pair of the registering openings 14 and 19, which edges facing in opposite directions, guard against any chance of telescopic action of the sleeve gears as long as the power applied thereto is from the housing. The condition set forth continues as long as the car runs in a substantially straight line and this statement applies to both forward and backing travel of the car, it being of course understood that there is a slight lost-motion attendant upon reversing the direction of rotation, as the pins 4 traverse the openings from one side to the other.

As the car turns a corner or describes an arc, the outer traction or drive wheel must turn more rapidly than the inner drive wheel. Assuming that in turning, the outer wheel begins to travel faster, its respective gear wheel 8 or 9, as the case may be, will tend to turn its respective sleeve gear 16 or 12 at greater speed. This will cause such sleeve gear, through two of its cams, to apply pressure onto two of the cams of the other sleeve, and as a result the sleeve related to the more rapidly operating drive wheel will telescope further onto, or into as the case may be, the other sleeve until the teeth of the withdrawing sleeve will become disengaged from the teeth of the related gear wheel and thereby permit such wheel and the drive wheel to be free to turn without exerting force tending to drive the car, the wheel at the inner side functioning for that purpose As the car straightens out in its travel the faster moving wheel slows down and the cam action described is reversed and the withdrawn sleeve is thereby forced outwardly until it is again re-engaged with its respective or related gear wheel A turn in the reverse direction functions in the same manner with respect to the other sleeve and its related gear wheel and drive wheel. The respective springs offer yielding resistance to the withdrawing action of the sleeves so that the movement thereof shall not be so quick as to produce an undesirable click or knocking sound. The chief function of the springs however, is to guard against accidental withdrawal action of either of the sleeves in the event the car is traveling a curved course and is tilted substantially sidewise, as when traveling upon the side of a hill, as the force of gravity in such instance would tend to effect the withdrawal of the respective sleeve from the gear wheel related to the drive wheel on the higher part of the roadway.

It will be clearly evident that as long as the driving power on both sleeves is derived solely from the housing through pins 4, whether on a level or a side hill, there can be no telescopic action whatever on the part of the sleeve gears and hence no possibility of the disengagement of one of them from its respective gear wheel The springs really function to guard against the production of clicks or noise which might otherwise develop after the teeth of the gearing have become somewhat worn under long and hard service.

The operation in general is as above described. It is believed however, that as the car travels on a curved line, the sleeve gear engaging the outside gear wheel is pulled out of and moves back into partial mesh a number of times, these actions permitting the gear wheel and the related drive or traction wheel to not only rotate fast enough to accommodate the speed of travel of the car without skidding or dragging of the drive wheel on the ground but also enabling the outside wheel to exert intermittent tractive force while describing the curve, a result not obtained, it is believed, with any other differential gearing, as far as I am aware. This opinion of the operation is of course theoretical as the in-and-out of mesh action would not be discernible to the eye if the general stationary differential casing, not shown, was omitted. As a basis for the theory of operation above expressed, it has been found in practice, that if a road is very muddy on a curve and the inside wheel slips, the outer wheel will immediately go into mesh and thus enable the driver to retain control of the car and minimize the chance of accident.

From the above description, it will be apparent that I have produced a differential gearing possessing meritorious features of construction and operation not heretofore proposed, and while the embodiment disclosed is that preferred, it is to be understood that it is susceptible of modification within the principle of construction and mode of operation involved.

I claim:

1. A differential gearing comprising a rotatable housing, one or more pins within and rotatable with the housing, a pair of gear wheels suitably journaled within the housing, a pair of axle members axially alined and rotatable with the gear wheels respectively, a pair of telescopically disposed sleeve gears suitably journaled within the housing and each adapted for intermeshing engagement in one of said gear wheels, and means whereby rotation of the housing shall cause the said pins to effect simultaneous rotation in the same direction and at the same speed, to said sleeve gears and hence to the respective shaft sections.

2. A differential gearing comprising a rotatable housing, one or more pins within and rotatable with the housing, a pair of gear wheels suitably journaled within the housing, a pair of axle members axially alined and rotatable with the gear wheels respectively, a pair of telescopically disposed sleeve gears suitably journaled within the housing and each adapted for intermeshing engagement in one of the said gear wheels, means whereby rotation of the housing shall cause the said pins to effect simultaneous rotation in the same direction and at the same speed, to said sleeve gears and hence to the respective shaft sections, and yielding means tending to maintain the sleeve gears in engagement with the respective gear wheels.

3. A differential gearing comprising a rotatable housing, one or more pins within and rotatable with the housing, a pair of gear wheels suitably journaled within the housing, a pair of axle members axially alined and rotatable with the gear wheels respectively, a pair of telescopically disposed sleeve gears suitably journaled within the housing and each adapted for intermeshing engagement in one of the said gear wheels, and means whereby acceleration of the speed of one of the axle members shall effect disengagement between the gear wheel rotatable with said axle member and the respective sleeve gear, and which, as the speed of such axle member is retarded effect relative movement to cause reengagement between the said gear wheel and sleeve gear as the speed of the axle members becomes equal.

4. A differential gearing comprising a rotatable housing, one or more pins within and rotatable with the housing, a pair of gear wheels suitably journaled within the housing, a pair of axle members axially alined and rotatable with the gear wheels respectively, a pair of telescopically disposed sleeve gears suitably journaled within the housing and each adapted for intermeshing engagement in one of the said gear wheels, means whereby acceleration of the speed of one of the axle members shall effect disengagement between the gear wheel rotatable with said axle member and the respective sleeve gear, and which, as the speed of such axle member is retarded effect relative movement to cause reengagement between the said gear wheel and sleeve gear as the speed of the axle members becomes equal, and spiral springs exerting force tending to hold the sleeve gears in engagement with their respective gear wheels.

5. A differential gearing comprising a rotatable housing, one or more pins within and rotatable with the housing, a pair of gear wheels suitably journaled within the housing, a pair of shaft members axially alined and rotatable with the gear wheels respectively, and a pair of telescopically disposed sleeve gears suitably journaled within the housing and each adapted for intermeshing engagement with one of said gear wheels; said sleeve gears being provided with registering circumferential openings receiving said pins, said openings being triangular in form with the hypotenuse sides of the openings of one sleeve converging toward the gear wheel engaged by said sleeve, and the corresponding sides of the openings of the other sleeve converging toward the other gear wheel.

6. A differential gearing comprising a rotatable housing, one or more pins within and rotatable with the housing, a pair of gear wheels suitably journaled within the housing, a pair of shaft members axially alined and rotable with the gear wheels respectively, and a pair of telescopically disposed sleeve gears suitably journaled within the housing and each adapted for intermeshing engagement with one of said gear wheels; said sleeve gears being provided with registering circumferential openings receiving said pins, said openings being triangular in form with the hypotenuse sides of the openings of one sleeve converging toward the gear wheel engaged by said sleeve, and the corresponding sides of the openings of the other sleeve converging toward the other gear wheel, and mutually engaging cam means on said sleeve gears whereby accelerated rotation of one of the latter shall effect telescopic action between them and the withdrawal of the sleeve gear accelerated from engagement with its respective gear wheel and whereby, upon the slowing down of the accelerated sleeve gear, said telescopic action shall be reversed to effect the re-engagement between the withdrawn sleeve gear and its respective gear wheel as the speed of rotation of the gear wheels becomes uniform.

7. A differential gearing comprising a rotatable housing, one or more pins within and rotatable with the housing, a pair of gear wheels suitably journaled within the housing, a pair of shaft members axially alined and rotatable with the gear wheels respectively, and a pair of telescopically disposed sleeve gears suitably journaled within the housing and each adapted for intermeshing engagement with one of said gear wheels; said sleeve gears being provided with registering circumferential openings receiving said pins, said openings being triangular in form with the hypotenuse sides of the openings of one sleeve converging toward the gear wheel engaged by said sleeve, and the corresponding sides of the openings of the other sleeve converging toward the other gear wheel, mutually engaging cam means on said sleeve gears whereby accelerated rotation of one of the latter shall effect telescopic action between them and the withdrawal of the sleeve gear accelerated from engagement with its respective gear wheel and whereby, upon the slowing down of the accelerated sleeve gear, said telescopic action shall be reversed to effect the re-engagement between the withdrawn sleeve gear and its respective gear wheel as the speed of rotation of the gear wheels becomes uniform, and springs within and bearing against the sides of the housing and the opposing ends of the sleeve gears and tending to resist withdrawal movement of said sleeve gears respectively from engagement with the respective gear wheels.

8. In a differential gearing, a pair of sleeve gears fitting telescopically together, and provided with registering triangular openings in their circumferential portions, the bases of said openings being parallel and the hypotenuse sides converging longitudinally of the gears in opposite directions, a rotatable housing having inwardly-projecting radial pins respectively engaging the registering openings of the sleeve gears, one of the sleeve gears having cam ribs and the other cam recesses engaging said ribs, each engaging cam rib and recess extending parallel with one of the hypotenuse sides of the adjacent registering openings, and means whereby either of said sleeve gears may be accelerated in speed over the speed of the housing to cause said cam ribs and recesses to effect relative telescopic movement between the sleeve gears.

In testimony whereof I affix my signature.

WILLIAM KIRN.